(12) United States Patent
Kang

(10) Patent No.: US 11,661,499 B2
(45) Date of Patent: May 30, 2023

(54) FUNCTIONALIZED PROCESSING AID, PREPARATION METHOD THEREOF, AND RUBBER COMPOSITION INCLUDING THE SAME

(71) Applicant: Korea Kumho Petrochemical Co., Ltd., Seoul (KR)

(72) Inventor: Dong Eun Kang, Daejeon (KR)

(73) Assignee: KOREA KUMHO PETROCHEMICAL CO., LTD., Seoul (KR)

(*) Notice: Subject to any disclaimer, the term of this patent is extended or adjusted under 35 U.S.C. 154(b) by 184 days.

(21) Appl. No.: 17/335,809

(22) Filed: Jun. 1, 2021

(65) Prior Publication Data
US 2022/0010107 A1   Jan. 13, 2022

(30) Foreign Application Priority Data
Jul. 13, 2020   (KR) .................. 10-2020-0085918

(51) Int. Cl.
*C08L 9/06* (2006.01)
*C08K 5/544* (2006.01)
*C08K 5/548* (2006.01)
*C08K 5/5425* (2006.01)
*C07F 7/08* (2006.01)

(52) U.S. Cl.
CPC .............. *C08L 9/06* (2013.01); *C07F 7/081* (2013.01); *C08K 5/544* (2013.01); *C08K 5/548* (2013.01); *C08K 5/5425* (2013.01); *C08L 2205/025* (2013.01); *C08L 2205/06* (2013.01)

(58) Field of Classification Search
CPC ........... C08L 9/06; C08K 5/544; C08K 5/548; C08K 5/5425
USPC ........................................... 524/188
See application file for complete search history.

(56) References Cited

U.S. PATENT DOCUMENTS

| | | | |
|---|---|---|---|
| 2013/0036940 A1* | 2/2013 | Tanaka | C08K 9/06 556/420 |
| 2019/0077815 A1 | 3/2019 | Natesh et al. | |

FOREIGN PATENT DOCUMENTS

| | | |
|---|---|---|
| KR | 10-1999-0012315 A | 2/1999 |
| KR | 10-2009-0113037 A | 10/2009 |
| KR | 10-2011-0116259 A | 10/2011 |
| KR | 10-2015-0007930 A | 1/2015 |
| KR | 10-2016-0024195 A | 3/2016 |

OTHER PUBLICATIONS

J. Appl. Polym. Sci. 2016, 43057.

* cited by examiner

Primary Examiner — Deve V Hall
(74) Attorney, Agent, or Firm — NKL Law; Jae Youn Kim

(57) ABSTRACT

Embodiments of the present invention provide a functionalized processing aid represented by the following Chemical Formula 1 in which a silane-based compound and a cardanol-derived structure are combined, a preparation method thereof, and a rubber composition including the same:

$$(R_1)_3Si-R_2-Z-(E)_n \qquad \text{[Chemical Formula 1]}$$

in Chemical Formula 1, the definitions of $R_1$, $R_2$, Z, E, and n are as described in the specification.

16 Claims, 1 Drawing Sheet

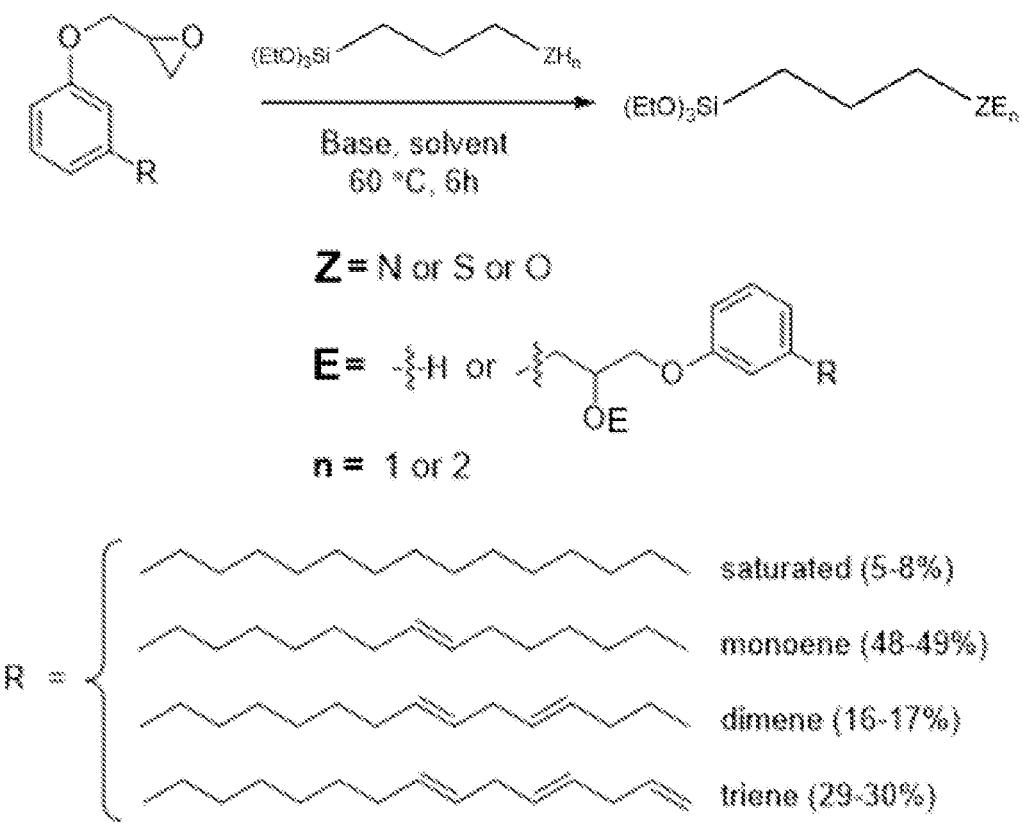

FUNCTIONALIZED PROCESSING AID, PREPARATION METHOD THEREOF, AND RUBBER COMPOSITION INCLUDING THE SAME

CROSS-REFERENCE TO RELATED APPLICATION

This application claims priority to and the benefit of Korean Patent Application No. 2020-0085918, filed on Jul. 13, 2020, the disclosure of which is incorporated herein by reference in its entirety.

BACKGROUND

1. Field of the Invention

The present invention relates to a processing aid, a preparation method thereof, and a rubber composition including the same, and specifically, to a processing aid which improves the processability of a rubber composition.

2. Discussion of Related Art

Rubber products such as tires and the like are manufactured by blending rubbers with various additives. In such a rubber blending process, a processing aid such as an extender oil, a processing oil, and the like is introduced to improve moldability and processability.

Conventional extender oils have a problem in which volatile organic compounds (VOCs) are excessively generated in blending and vulcanization processes due to the low molecular weight of the material itself. Also, an extender oil is not combined with a rubber composition inside a tire, which is a final product, but migrates to the surface, causing a blooming phenomenon in which spots are generated. Therefore, there is a need to develop an alternative capable of solving the problems.

Conventional tires include carbon black as a reinforcing material, but carbon black causes environmental pollution. Therefore, a technology for replacing carbon black with silica is being studied, and environmentally-friendly tires manufactured thereby have excellent fuel efficiency. However, since silica is hydrophilic unlike rubber that generally is hydrophobic, silica has low bonding strength with rubber constituting a continuous phase, that is, a matrix, of a tire, and thus wet traction, abrasion performance, and the like of the tire are insufficient, and rolling resistance is exhibited, leading to degradation of fuel efficiency. Accordingly, a coupling technology for enhancing the bonding strength between tire rubber and silica has been developed, but research on a technology for enhancing the bonding strength between a processing aid included in a rubber composition and silica is insufficient.

SUMMARY OF THE INVENTION

The present invention has been made to solve the above-described problems of the related art, and an objective of the present invention is to provide a processing aid, which is capable of enhancing the processability of a rubber composition and is highly compatible with a reinforcing agent, and a preparation method thereof.

Another objective of the present invention is to provide a rubber composition which has excellent processability by including the above-described processing aid and can be used to manufacture a product having excellent mechanical and dynamic properties.

One aspect of the present invention provides a functionalized processing aid represented by the following Chemical Formula 1 in which a silane-based compound and a cardanol-derived structure are combined:

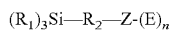 [Chemical Formula 1]

In Chemical Formula 1, $R_1$ is each independently a C1 to C10 linear or branched alkyl group or alkoxy alkyl group, $R_2$ is a C1 to C20 linear or branched alkylene group, Z is nitrogen, sulfur, or oxygen, E is hydrogen or a cardanol-derived structure represented by the following Chemical Formula 1-1

[Chemical Formula 1-1]

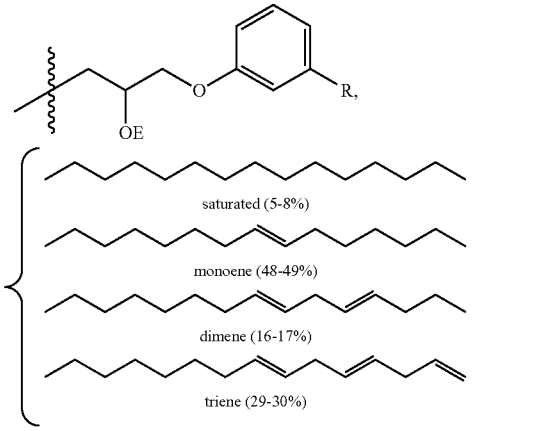

at least one E is not hydrogen, and n is 1 or 2.

According to an embodiment, a molar ratio of the silane-based compound and the cardanol-derived structure may be 1:2 to 8.

According to an embodiment, the silane-based compound may be at least one selected from the group consisting of 1-(trimethoxysilyl)methanamine, 1-(triethoxysilyl)methanamine, 2-(trimethoxysilyl)ethanamine, 2-(triethoxysilyl)ethanamine, 3-aminopropyltrimethoxysilane, 3-aminopropyltriethoxysilane, 4-aminobutyltrimethoxysilane, 4-aminobutyltriethoxysilane, 3-aminopropylmethyldimethoxysilane, 3-aminopropylmethyldiethoxysilane, 3-aminopropylethyldimethoxysilane, 3-aminopropylethyldiethoxysilane, 3-aminopropyldimethylmethoxysilane, 3-aminopropyldimethylethoxysilane, 3-aminopropyldiethylmethoxysilane, 3-aminopropyldiethylethoxysilane, N-(2-aminoethyl)-3-aminopropylmethyldimethoxysilane, N-2-(aminoethyl)-3-aminopropylmethyldimethoxysilane, N-2-(aminoethyl)-3-aminopropyltrimethoxysilane, N-(3-(trimethoxysilyl]propyl)butylamine, diethylenetriaminepropyltrimethoxysilane, diethylaminomethyltriethoxysilane, N-phenyl-3-aminopropyltrimethoxysilane, (N-phenylamino)methyltriethoxysilane, and N-(3-aminopropyl)cyclohexaneamine.

According to an embodiment, the silane-based compound may be at least one selected from the group consisting of 1-(trimethoxysilyl)methanethiol, 1-(triethoxysilyl)methanethiol, 2-(trimethoxysilyl)ethanethiol, 2-(triethoxysilyl)ethanethiol, (3-mercaptopropyl)trimethoxysilane, (3-mercaptopropyl)triethoxysilane, 4-mercaptobutyltrimethoxysilane, 4-mercaptobutyltriethoxysilane, (3-mercaptopropyl)methyldimethoxysilane, (3-mercaptopropyl)methyldiethoxysilane, (3-mercaptopropyl)ethyldimethoxysilane, (3-mercaptopropyl)ethyldiethoxysilane, (3-mercaptopropyl)dimethylmethoxysilane, (3-mercaptopropyl)dimethylethoxysilane, (3-mercaptopropyl)diethylmethoxysilane, and (3-mercaptopropyl)diethylethoxysilane.

According to an embodiment, the silane-based compound may be at least one selected from the group consisting of 3-glycidoxypropylmethyldimethoxysilane, 3-glycidoxypropyltrimethoxysilane, 3-glycidoxypropylmethyldiethoxysilane, 3-glycidoxypropyltriethoxysilane, 2-(3,4-epoxycyclohexyl)ethyltrimethoxysilane, and 2-(3,4-epoxycyclohexyl)ethyltriethoxysilane.

Another aspect of the present invention provides a method of preparing a functionalized processing aid, which includes the steps of: (a) preparing a mixture of a silane-based compound, epoxidized cardanol, and a solvent in the presence of a base; and (b) reacting the mixture to prepare a functionalized processing aid.

According to an embodiment, the base may be at least one selected from the group consisting of the hydride, hydroxide, carbonate, bicarbonate, and amine of an alkali metal or an alkaline earth metal.

According to an embodiment, the solvent may be at least one selected from the group consisting of ethanol, dimethylformaldehyde, and tetrahydrofuran.

According to an embodiment, the step (b) may be performed by adjusting a temperature of the mixture to 20 to 100° C.

Still another aspect of the present invention provides a rubber composition which includes: a rubbery polymer; a reinforcing agent; and the above-described functionalized processing aid.

According to an embodiment, the rubbery polymer may include at least one of a first polymer formed by solution polymerization of an aromatic vinyl monomer and a conjugated diene-based monomer and a second polymer formed by polymerization of a conjugated diene-based monomer.

According to an embodiment, the aromatic vinyl monomer may be at least one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyl dimethylamine, (4-vinylbenzyl)dimethylaminoethyl ether, vinylpyridine, vinylxylene, diphenylethylene, tertiary amine-containing diphenylethylene, and primary, secondary, or tertiary amine-containing styrene, and the conjugated diene-based monomer may be at least one selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, and octadiene.

According to an embodiment, the rubbery polymer may include the first polymer and the second polymer in a weight ratio of 10 to 200:10 to 200.

According to an embodiment, the reinforcing agent may be included in an amount of 10 to 200 parts by weight based on 100 parts by weight of the rubbery polymer.

According to an embodiment, the rubber composition may further include an extender oil.

According to an embodiment, a weight ratio of the extender oil and the processing aid may be 15 to 55:5 to 45.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawing, in which:

FIG. 1 is a schematic diagram of a method of preparing a functionalized processing aid according to an embodiment of the present invention.

DETAILED DESCRIPTION OF EXEMPLARY EMBODIMENTS

Hereinafter, the present invention will be described in detail with reference to the accompanying drawing. However, it should be understood that the present invention can be implemented in various forms, and that it is not intended to limit the present invention to the exemplary embodiments. Also, in the drawing, descriptions of parts unrelated to the detailed description are omitted to clearly describe the present invention. Throughout the specification, like numbers refer to like elements.

Throughout the specification, a certain part being "connected" to another part means that the certain part is "directly connected" to the other part or that the certain part is "indirectly connected" to the other part through another member interposed between the two parts. Also, a certain part "including" a certain element signifies that the certain part may further include, instead of excluding, another element unless particularly indicated otherwise.

When a numerical value is presented herein, the value has the precision of the significant digit provided in accordance with the standard rules in chemistry for significant digits unless its specific range is stated otherwise. For example, the numerical value 10 includes the range of 5.0 to 14.9 and the numerical value 10.0 includes the range of 9.50 to 10.49.

Hereinafter, the present invention will be described in detail with reference to the accompanying drawing.

Functionalized Processing Aid

In the present invention a "functionalized processing aid" means that a processing aid which enhances the flexibility of rubber to improve processability is functionalized by introduction of a specific functional group.

A functionalized processing aid according to one aspect of the present invention may be represented by the following Chemical Formula 1 in which a silane-based compound and a cardanol-derived structure are combined:

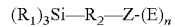

$(R_1)_3Si—R_2—Z-(E)_n$     [Chemical Formula 1]

In Chemical Formula 1, $R_1$ is each independently a C1 to C10 (e.g., C1, C2, C3, C4, C5, C6, C7, C8, C9, or C10) linear or branched alkyl group or alkoxy alkyl group and may have an effect of improving compatibility between a functionalized processing aid and a reinforcing agent.

$R_2$ is a structure that connects a silane-based compound and a cardanol-derived structure and may be a C1 to C20 (e.g., C1, C2, C3, C4, C5, C6, C7, C8, C9, C10, C11, C12, C13, C14, C15, C16, C17, C18, C19, or C20) linear or branched alkylene group.

Z is a nucleophilic terminus-derived structure that imparts reactivity with a cardanol-derived compound, for example, epoxidized cardanol, to a silane-based compound and may be nitrogen, sulfur or oxygen. According to the type of Z, n may be 1 or 2.

E is each independently hydrogen or a cardanol-derived structure represented by the following Chemical Formula 1-1, and at least one E may not be hydrogen:

[Chemical Formula 1-1]

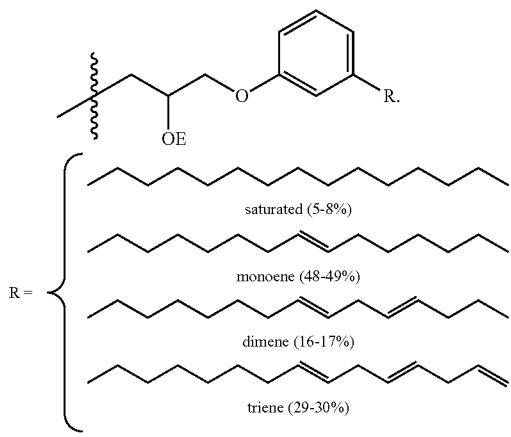

Since the cardanol-derived structure represented by Chemical Formula 1-1 includes a —OE group, a cardanol-derived structure may be additionally connected. In this case, E may have an effect of improving processability by imparting flexibility to a rubber composition. R may be a structure derived from cardanol.

The silane-based compound is a silane compound that has at least one silicon atom and at least one thiol group, amino group, or alcohol group in the molecule thereof. Since the silane-based compound includes a functional group that is able to be combined with an organic material and an inorganic material, it may serve to improve compatibility between the organic material and the inorganic material and thus may enhance the mechanical strength of a composite material. For example, when introduced into the constituent component of a rubber composition for a tire, the silane-based compound may improve the bonding strength between rubber and a reinforcing agent, and thus the mechanical strength, fuel efficiency, abrasion characteristics, and the like of a final product may be improved.

The silane-based compound may be chemically combined with an organic material such as rubber, an oil, and the like by including at least one thiol group, amino group, or alcohol group, and the silane portion including at least one silicon atom may enhance affinity to an inorganic material.

The silane-based compound may be an alkoxysilane compound, and the alkoxysilane compound may be formed by at least one alkoxy group binding to a silicon atom in the silane-based compound and thus may chemically bind to an inorganic material such as glass, a metal, an inorganic filler, and the like. When an alkoxy group in the alkoxysilane compound is a methoxy group, hydrolysis may rapidly proceed, and when the alkoxy group is an ethoxy group, hydrolysis relatively slowly proceeds, and thus stability may be excellent. As the number of alkoxy groups increases, reactivity and crosslinking density are enhanced, and thus strong bonding with an inorganic material may be formed.

The functionalized processing aid may include the silane-based compound and the cardanol-derived structure represented by Chemical Formula 1-1 in a molar ratio of 1:2 to 8. For example, the cardanol-derived structure may be combined in an amount of 2 moles, 3 moles, 4 moles, 5 moles, 6 moles, 7 moles, 8 moles, or an amount between two values thereof with 1 mole of the silane-based compound, but the present invention is not limited thereto. When the proportion of the cardanol-derived structure is excessively low, it may be difficult to improve the processability of a rubber composition, and when excessively high, an effect of improving compatibility with a reinforcing agent may be insignificantly exhibited.

The cardanol-derived structure may enhance vulcanizability with rubber by including a double bond capable of participating in crosslinking in a vulcanization process of a rubber composition. Also, since the cardanol-derived structure exhibits hydrophobicity due to including a phenyl group and hydrocarbon, it may enhance processability with rubber. The silane portion in the functionalized processing aid may improve an ability of a rubber composition to be mixed with a silane-based additive to improve the dispersibility of a hydrophilic reinforcing agent and may enhance hydrogen bonding strength with various hydrophilic functional groups on the surface of a reinforcing agent to impart hydrophilicity, resulting in improvement in the mechanical properties and viscoelasticity of a final product.

Method of Preparing Functionalized Processing Aid

A method of preparing a functionalized processing aid according to another aspect of the present invention includes the steps of: (a) preparing a mixture of a silane-based compound, epoxidized cardanol, and a solvent in the presence of a base; and (b) reacting the mixture to prepare a functionalized processing aid.

The epoxidized cardanol may be added in an excessive amount compared to the silane-based compound. For example, the epoxidized cardanol may be added in an amount of 2 to 8 moles based on 1 mole of the silane-based compound to form at least 2 to 8 cardanol-derived structures, but the present invention is not limited thereto.

The base may be at least one selected from the group consisting of the hydride, hydroxide, carbonate, bicarbonate, and amine of an alkali metal or an alkaline earth metal, but the present invention is not limited thereto. The base may promote a reaction of the epoxidized cardanol.

The description of the silane-based compound is as described above.

Cardanol is a raw material extracted from the cashew nut which is a natural material, and the epoxidized cardanol may be cardanol glycidyl ether formed by a reaction between a hydroxyl group (—OH) of cardanol and epichlorohydrin, but the present invention is not limited thereto.

As the solvent, a polar organic solvent capable of increasing the solubility of reactants may be used. For example, the solvent may be at least one selected from the group consisting of ethanol, dimethylformaldehyde, and tetrahydrofuran, but the present invention is not limited thereto.

In the step (a), a mixture may be prepared at room temperature in consideration of the reactivity of the epoxidized cardanol. The step (b) may be performed by adjusting a temperature of the mixture to 20 to 100° C., for example, 20° C., 21° C., 22° C., 23° C., 24° C., 25° C., 26° C., 27° C., 28° C., 29° C., 20° C., 31° C., 32° C., 33° C., 34° C., 35° C., 36° C., 37° C., 38° C., 39° C., 20° C., 41° C., 42° C., 43° C., 44° C., 45° C., 46° C., 47° C., 48° C., 49° C., 20° C., 51° C., 52° C., 53° C., 54° C., 55° C., 56° C., 57° C., 58° C., 59° C., 20° C., 61° C., 62° C., 63° C., 64° C., 65° C., 66° C., 67° C., 68° C., 69° C., 20° C., 71° C., 72° C., 73° C., 74° C., 75° C., 76° C., 77° C., 78° C., 79° C., 20° C., 81° C., 82° C., 83° C., 84° C., 85° C., 86° C., 87° C., 88° C., 89° C., 20° C., 91° C., 92° C., 93° C., 94° C., 95° C., 96° C., 97° C., 98° C., 99°

C., 100° C., and a temperature between two values thereof, but the present invention is not limited thereto.

Rubber Composition

A rubber composition according to still another aspect of the present invention includes: a rubbery polymer; a reinforcing agent; and the above-described functionalized processing aid. The rubber composition may be used in tires, shoes, and the like, but the present invention is not limited thereto.

The configuration and effect of the functionalized processing aid are as described above.

The rubbery polymer may include at least one of a first polymer formed by solution polymerization of an aromatic vinyl monomer and a conjugated diene-based monomer and a second polymer formed by polymerization of a conjugated diene-based monomer, but the present invention is not limited thereto.

The aromatic vinyl monomer may be at least one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyl dimethylamine, (4-vinylbenzyl)dimethylaminoethyl ether, vinylpyridine, vinylxylene, diphenylethylene, tertiary amine-containing diphenylethylene, and primary, secondary, or tertiary amine-containing styrene, and the conjugated diene-based monomer may be at least one selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, and octadiene, but the present invention is not limited thereto.

As one example, when the aromatic vinyl monomer is styrene and the conjugated diene-based monomer is 1,3-butadiene, the first polymer may be styrene-butadiene rubber. The styrene-butadiene rubber may be emulsion polymerized styrene-butadiene rubber or solution polymerized styrene-butadiene rubber, and coupling with a compound containing an oxygen, nitrogen, or silicon element may occur therebetween, or the terminus thereof may be modified with a functional compound, but the present invention is not limited thereto.

As another example, when the conjugated diene-based monomer is 1,3-butadiene, the second polymer may be polybutadiene rubber, and the polybutadiene rubber may be high-cis polybutadiene rubber, low-cis polybutadiene rubber, or ultra high-cis polybutadiene rubber prepared with a neodymium-based catalyst, but the present invention is not limited thereto.

The rubbery polymer may include the first polymer and the second polymer in a weight ratio of 10 to 200:10 to 200. The weight ratio of the first polymer and the second polymer may be adjusted according to characteristics of a desired product.

The reinforcing agent may improve the strength of a product made of the rubber composition and may be, for example, carbon black or silica, but the present invention is not limited thereto. The reinforcing agent may be included in an amount of 10 to 200 parts by weight, for example, 10 parts by weight, 20 parts by weight, 30 parts by weight, 40 parts by weight, 50 parts by weight, 60 parts by weight, 70 parts by weight, 80 parts by weight, 90 parts by weight, 100 parts by weight, 110 parts by weight, 120 parts by weight, 130 parts by weight, 140 parts by weight, 150 parts by weight, 160 parts by weight, 170 parts by weight, 180 parts by weight, 190 parts by weight, 200 parts by weight, or an amount between two values thereof, based on 100 parts by weight of the rubbery polymer. The type and content of the reinforcing agent may be adjusted according to characteristics of a desired product.

The rubber composition may further include an extender oil. The extender oil may be, for example, at least one selected from the group consisting of treated distillate aromatic extract oil (TDAE oil), mild extraction solvate oil (MES oil), residual aromatic extract oil (RAE oil), and heavy naphthenic oil, but the present invention is not limited thereto.

A weight ratio of the extender oil and the processing aid may be 15 to 55:5 to 45. For example, a weight ratio of the extender oil and the processing aid may be 55:5, 54:6, 53:7, 52:8, 51:9, 50:10, 49:11, 48:12, 47:13, 46:14, 45:15, 44:16, 43:17, 42:18, 41:19, 40:10, 39:21, 38:22, 37:23, 36:24, 35:25, 34:26, 33:27, 32:28, 31:29, 30:30, 29:31, 28:32, 27:33, 26:34, 25:35, 24:36, 23:37, 22:38, 21:39, 20:40, 19:41, 18:42, 17:43, 16:44, or 15:45, but the present invention is not limited thereto.

When the weight ratio of the extender oil and the processing aid is within the above-described range, the processability of the rubber composition and the mechanical strength, fuel efficiency, and ice grip of a final product can be substantially improved.

Hereinafter, exemplary embodiments of the present invention will be described in more detail. However, hereinafter, only experimental results obtained from a few selected exemplary embodiments of the present invention will be described, and the scope and contents of the present invention should not be interpreted as being reduced or limited by the few selected exemplary embodiments. The effects of each of the various embodiments of the present invention which are not explicitly set forth below will be described in detail in relevant sections.

FIG. 1 shows an example of a method of preparing a functionalized processing aid described in the present invention. According to this example, a functionalized processing aid mixture in which a silane-based compound and a cardanol-derived structure are combined in various molar ratios by a nucleophilic ring-opening chain reaction may be prepared.

Referring to FIG. 1, the functionalized processing aid may be prepared by introducing an epoxy functional group into cardanol derived from a natural material and allowing a reaction with a nucleophilic terminus present at the terminus of an alkyl chain of a silane-based compound.

Preparation Example 1

Epichlorohydrin (670 g, 3.0 eq) was added to cardanol (720 g, 1.0 eq) in a reactor, and 40% NaOH (337.7 g, 1.0 eq) was added dropwise for 90 minutes until a reaction temperature was raised from 20° C. to 70° C. After the dropwise addition of NaOH was completed, the reaction was allowed to further proceed for 2 hours while maintaining a temperature of the reaction product at 55 to 60° C. to obtain an epoxidized cardanol-containing solution. The solution was analyzed by gas chromatography (GC), and it was confirmed that the solution consisted of unreacted cardanol 1.2%, epoxidized cardanol 85.9%, 2-methyl-cardol glycidyl ether 4.2%, cardol diglycidyl ether 4.7%, and a dimer 3.6%.

Afterward, the obtained solution was filtered to remove a sodium chloride salt, and the filtered solution was input into a separatory funnel to separate layers for an hour. The lower layer thus separated was removed, the upper layer was input into a reactor, and concentration was performed under reduced pressure at 120° C. to remove moisture and unreacted epichlorohydrin. The concentrated product was filtered to remove a sodium chloride salt, thereby obtaining epoxidized cardanol.

The epoxidized cardanol and 3-aminopropyltriethoxysilane were added to an ethanol solvent. n-Butyllithium was added to the reaction product, a temperature was raised to 60° C., and a reaction was performed for 6 hours, thereby obtaining a functionalized processing aid.

As a result of an additional experiment, it was possible to prepare the functionalized processing aid at a reaction temperature of 20 to 100° C. using the hydride, hydroxide, carbonate, bicarbonate, and amine of an alkali metal or an alkaline earth metal as a catalyst. Also, when a polar organic solvent capable of increasing the solubility of reactants, such as ethanol, dimethylformaldehyde, and tetrahydrofuran, was used as a reaction solvent, a reaction proceeded more smoothly.

It was confirmed that the functionalized processing aid was formed by combining 2 to 8 moles of cardanol with 1 mole of a silane-based compound.

Preparation Example 2

A functionalized processing aid was prepared in the same manner as in Preparation Example 1, except that 3-mercaptopropyltriethoxysilane was used instead of 3-aminopropyltriethoxysilane.

Preparation Example 3

A functionalized processing aid was prepared in the same manner as in Preparation Example 1, except that 2-(3,4-epoxycyclohexyl)ethyltrimethoxysilane was used instead of 3-aminopropyltriethoxysilane.

Examples and Comparative Examples

The functionalized processing aid of Preparation Example 1 was blended in a 500 cc lab mixer under conditions shown in the following Table 1 to prepare a rubber composition.

TABLE 1

| Mixing composition | Comparative Example 1 (phr) | Example 1 (phr) | Example 2 (phr) | Example 3 (phr) | Example 4 (phr) | Example 5 (phr) | Example 6 (phr) | Example 7 (phr) | Example 8 (phr) | Example 9 (phr) | Example 10 (phr) |
|---|---|---|---|---|---|---|---|---|---|---|---|
| Solution SBR | 80 | 80 | 80 | 80 | 80 | 80 | 80 | 80 | 80 | 80 | 80 |
| NdBR | 20 | 20 | 20 | 20 | 20 | 20 | 20 | 20 | 20 | 20 | 20 |
| Silica | 80 | 80 | 80 | 80 | 80 | 80 | 80 | 80 | 80 | 80 | 80 |
| X50S | 12.8 | 12.8 | 12.8 | 12.8 | 12.8 | 12.8 | 12.8 | 12.8 | 12.8 | 12.8 | 12.8 |
| $ZnO_2$ | 3 | 3 | 3 | 3 | 3 | 3 | 3 | 3 | 3 | 3 | 3 |
| TDAE oil | 30 | 20 | 20 | 20 | 20 | 24 | 22 | 18 | 16 | 14 | 12 |
| Functionalized processing aid (cardanol 2 moles) | 0 | 10 | 0 | 0 | 0 | 0 | 0 | 0 | 0 | 0 | 0 |
| Functionalized processing aid (cardanol 4 moles) | 0 | 0 | 10 | 0 | 0 | 6 | 8 | 12 | 14 | 16 | 18 |
| Functionalized processing aid (cardanol 6 moles) | 0 | 0 | 0 | 10 | 0 | 0 | 0 | 0 | 0 | 0 | 0 |
| Functionalized processing aid (cardanol 8 moles) | 0 | 0 | 0 | 0 | 10 | 0 | 0 | 0 | 0 | 0 | 0 |
| CZ | 1 | 1 | 1 | 1 | 1 | 1 | 1 | 1 | 1 | 1 | 1 |
| DPG | 1.5 | 1.5 | 1.5 | 1.5 | 1.5 | 1.5 | 1.5 | 1.5 | 1.5 | 1.5 | 1.5 |
| Sulfur | 1.5 | 1.5 | 1.5 | 1.5 | 1.5 | 1.5 | 1.5 | 1.5 | 1.5 | 1.5 | 1.5 |

Solution SBR: SOL5130H (Kumho Petrochemical.)
NdBR: NdBR 40 (Kumho Petrochemical.)
X50S: X50-S (Evonik Industries)
CZ: N-cyclohexyl benzothiazyl sulfenamide
DPG: 1,3-diphenylguanidine The processability, mechanical properties, and dynamic properties of the rubber composition prepared according to Examples and Comparative Example were measured, and results thereof are shown in Table 2 below. Measurement methods of the properties are as follows.

Compound Mooney viscosity: A non-vulcanized blend were attached to front and rear surfaces of a rotor, and the rotor was mounted on a rotational viscometer (MOONEY MV2000 commercially available from ALPHA Technologies). The rotor was preheated to 100° C. for the first 1 minute and then operated, and a 4-minute change in viscosity of the blend was measured, thereby obtaining compound Mooney viscosity expressed as $ML_{1+4}$ @ 100° C.

Hardness: measured using a Shore-A hardness tester.

Tensile strength, modulus, and elongation rate: measured using a universal test machine (UTM) in accordance with ASTM 3189 Method B.

Lambourn abrasion characteristics: measured by bringing a specimen and a grinding stone in direct contact using a Lambourn abrasion tester.

Dynamic property value of vulcanized rubber (Tan δ): analyzed at a frequency of 10 Hz and a strain of 0.2 using a DMTA 5 instrument commercially available from Rheometrics.

Payne (ΔG'): The degree of dispersion of silica was confirmed by measuring a variation in G' value at 60° C. and a strain ranging 0.28 to 40% using a tester (RPA2000 commercially available from ALPHA Technologies).

structure in an amount of 4 moles based on 1 mole of a silane-based compound exhibited the best processability.

Examples exhibited low hardness compared to Comparative Example 1, and thus the noise characteristics of a final product could be improved, and physical properties such as modulus were excellent. It is speculated that this is because the silane group introduced into the functionalized processing aid participated in the crosslinking process of the rubber composition, and it was indirectly confirmed that the functionalized processing aid could increase the strength of rubber by increasing crosslinking density with sulfur in the blending of the rubber composition.

In addition, Examples exhibited remarkably excellent E' @ −20° C., which indicates ice grip, compared to Comparative Example 1, and also exhibited substantially low Payne values compared to that of Comparative Example 1. From these results, it can be seen that the functionalized processing aid can improve the dispersibility of silica.

Referring to Examples 1 to 4, a change in physical properties according to a reaction molar ratio of cardanol can be confirmed. Referring to Examples 2 and 5 to 10 in which the same molar ratio of a functionalized processing aid was added in varying amounts, it can be seen that an appropriate amount of the functionalized processing aid can be blended to improve processability indicated by compound Mooney viscosity, physical properties of rubber indicated by 300% modulus, tensile strength, and an elongation rate, ice grip indicated by E' @ −20° C., fuel efficiency indicated by tan δ @ 60° C., and the like.

TABLE 2

| Classification | Comparative Example 1 | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Compound Mooney viscosity (@ 100° C.) | 113.8 | 92.2 | 87.8 | 94.4 | 98.6 | 96.3 | 91.8 | 90.1 | 89.2 | 89.6 | 90.1 |
| Minimum torque (dNm) | 9.76 | 7.04 | 6.15 | 6.41 | 6.65 | 7.07 | 6.52 | 6.31 | 6.28 | 6.34 | 6.37 |
| Maximum torque (dNm) | 35.61 | 36.11 | 34.64 | 34.64 | 32.79 | 33.88 | 34.03 | 37.98 | 39.54 | 41.36 | 42.47 |
| ΔTorque (maximum torque − minimum torque) | 25.85 | 29.46 | 28.49 | 28.05 | 25.75 | 26.81 | 27.51 | 31.67 | 33.26 | 35.02 | 36.1 |
| Hardness (Shore A) | 72 | 67 | 66 | 65 | 65 | 68 | 67 | 70 | 71 | 71 | 72 |
| 100% Modulus (kgf/cm$^2$) | 30.91 | 32.88 | 31.57 | 30.26 | 29.56 | 31.21 | 30.4 | 34.32 | 36.52 | 36.28 | 36.17 |
| 300% Modulus (kgf/cm$^2$) | 115.61 | 130.93 | 126.81 | 118.53 | 114.87 | 123.11 | 124.49 | 32.86 | 135.64 | 132.04 | 129.43 |
| Tensile strength (kgf/cm$^2$) | 177.35 | 170.95 | 180.63 | 182.64 | 185.63 | 180.94 | 181.1 | 181.41 | 179.18 | 173.61 | 159.35 |
| Elongation rate (%) | 415.83 | 374.2 | 386.85 | 392.72 | 429.97 | 425.45 | 407.2 | 399.9 | 356.85 | 357.67 | 364.88 |
| E' at −20° C. | 37.4 | 28.44 | 26.78 | 27.09 | 26.01 | 29.25 | 27.46 | 30.88 | 34.45 | 36.54 | 37.41 |
| Tanδ at 0° C. | 0.1862 | 0.1787 | 0.1769 | 0.179 | 0.1852 | 0.1789 | 0.1741 | 0.1746 | 0.1741 | 0.1744 | 0.1766 |
| Tanδ at 60° C. | 0.0992 | 0.0957 | 0.0918 | 0.0981 | 0.1017 | 0.0949 | 0.0919 | 0.0945 | 0.0972 | 0.0981 | 0.0994 |
| Payne (ΔG', kpa) | 618.34 | 168.05 | 180.64 | 196.88 | 197.56 | 270.07 | 172.83 | 196.16 | 198.96 | 195.15 | 201.57 |

Referring to Table 2, in the case of Examples including a functionalized processing aid, Mooney viscosities were lower than that of Comparative Example 1 including only TDAE oil, and thus excellent processability was exhibited. In particular, when the same amount of a functionalized processing aid was added, Example 2 including a cardanol According to one aspect of the present invention, a processing aid capable of enhancing processability and improving compatibility with a reinforcing agent can be prepared.

According to another aspect of the present invention, a rubber composition, which has excellent processability and can be used to manufacture a product having excellent mechanical and dynamic properties, can be prepared.

However, it is to be understood that the effects of the present invention are not limited to the above-described effects but include all effects deducible from the configuration of the invention described in the detailed description of the present invention or in the claims.

The foregoing description of the present invention is intended for illustration, and it will be understood by those skilled in the art to which the present invention pertains that the present invention can be easily modified and implemented in various other forms without changing the technical spirit or essential features of the present invention. Therefore, it should be understood that the embodiments described above are only exemplary in all aspects and not limiting. For example, each of the constituents described as being one combined entity may be implemented separately, and similarly, constituents described as being separate entities may be implemented in a combined form.

It should be understood that the scope of the present invention is defined by the following claims and that all changes or modifications derived from the meaning and scope of the claims and their equivalents are included in the scope of the present invention.

What is claimed is:

1. A functionalized processing aid represented by the following Chemical Formula 1 in which a silane-based compound and a cardanol-derived structure are combined:

$(R_1)_3Si-R_2-Z-(E)_n$  [Chemical Formula 1]

in Chemical Formula 1,
$R_1$ is each independently a C1 to C10 linear or branched alkyl group or alkoxy alkyl group,
$R_2$ is a C1 to C20 linear or branched alkylene group,
Z is nitrogen, sulfur, or oxygen,
E is each independently hydrogen or a cardanol-derived structure represented by the following Chemical Formula 1-1

[Chemical Formula 1-1]

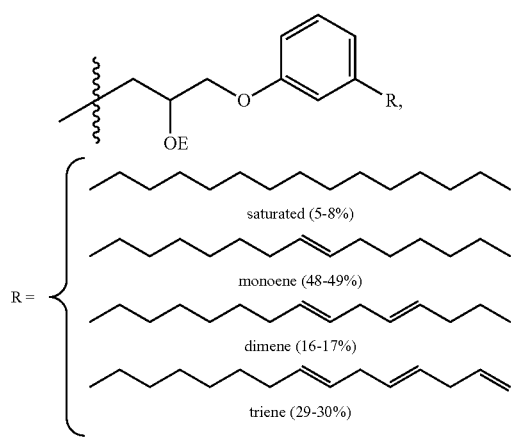

at least one E is not hydrogen, and
n is 1 or 2.

2. The functionalized processing aid of claim 1, wherein a molar ratio of the silane-based compound and the cardanol-derived structure is 1:2 to 8.

3. The functionalized processing aid of claim 1, wherein the silane-based compound is at least one selected from the group consisting of 1-(trimethoxysilyl)methanamine, 1-(triethoxysilyl)methanamine, 2-(trimethoxysilyl)ethanamine, 2-(triethoxysilyl)ethanamine, 3-aminopropyltrimethoxysilane, 3-aminopropyltriethoxysilane, 4-aminobutyltrimethoxysilane, 4-aminobutyltriethoxysilane, 3-aminopropylmethyldimethoxysilane, 3-aminopropylmethyldiethoxysilane, 3-aminopropylethyldimethoxysilane, 3-aminopropylethyldiethoxysilane, 3-aminopropyldimethylmethoxysilane, 3-aminopropyldimethylethoxysilane, 3-aminopropyldiethylmethoxysilane, 3-aminopropyldiethylethoxysilane, N-(2-aminoethyl)-3-aminopropylmethyldimethoxysilane, N-2-(aminoethyl)-3-aminopropylmethyldimethoxysilane, N-2-(aminoethyl)-3-aminopropyltrimethoxysilane, N-(3-(trimethoxysilyl]propyl)butylamine, diethylenetriaminepropyltrimethoxysilane, diethylaminomethyltriethoxysilane, N-phenyl-3-aminopropyltrimethoxysilane, (N-phenylamino)methyltriethoxysilane, and N-(3-aminopropyl)cyclohexaneamine.

4. The functionalized processing aid of claim 1, wherein the silane-based compound is at least one selected from the group consisting of 1-(trimethoxysilyl)methanethiol, 1-(triethoxysilyl)methanethiol, 2-(trimethoxysilyl)ethanethiol, 2-(triethoxysilyl)ethanethiol, 3-mercaptopropyltrimethoxysilane, 3-mercaptopropyltriethoxysilane, 4-mercaptobutyltrimethoxysilane, 4-mercaptobutyltriethoxysilane, 3-mercaptopropylmethyldimethoxysilane, 3-mercaptopropylmethyldiethoxysilane, 3-mercaptopropylethyldimethoxysilane, 3-mercaptopropylethyldiethoxysilane, 3-mercaptopropyldimethylmethoxysilane, 3-mercaptopropyldimethylethoxysilane, 3-mercaptopropyldiethylmethoxysilane, and 3-mercaptopropyldiethylethoxysilane.

5. The functionalized processing aid of claim 1, wherein the silane-based compound is at least one selected from the group consisting of 3-glycidoxypropylmethyldimethoxysilane, 3-glycidoxypropyltrimethoxysilane, 3-glycidoxypropylmethyldiethoxysilane, 3-glycidoxypropyltriethoxysilane, 2-(3,4-epoxycyclohexyl)ethyltrimethoxysilane, and 2-(3,4-epoxycyclohexyl)ethyltriethoxysilane.

6. A method of preparing a functionalized processing aid of claim 1, comprising the steps of: (a) preparing a mixture of a silane-based compound, epoxidized cardanol, and a solvent in the presence of a base; and (b) reacting the mixture to prepare a functionalized processing aid.

7. The method of claim 6, wherein the base is at least one selected from the group consisting of the hydride, hydroxide, carbonate, bicarbonate, and amine of an alkali metal or an alkaline earth metal.

8. The method of claim 6, wherein the solvent is at least one selected from the group consisting of ethanol, dimethylformaldehyde, and tetrahydrofuran.

9. The method of claim 6, wherein the step (b) is performed by adjusting a temperature of the mixture to 20 to 100° C.

10. A rubber composition comprising:
a rubbery polymer;
a reinforcing agent; and
the functionalized processing aid of claim 1.

11. The rubber composition of claim 10, wherein the rubbery polymer includes at least one of a first polymer formed by solution polymerization of an aromatic vinyl monomer and a conjugated diene-based monomer and a second polymer formed by polymerization of a conjugated diene-based monomer.

12. The rubber composition of claim 11, wherein the aromatic vinyl monomer is at least one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyl dimethylamine, (4-vinylbenzyl) dimethylaminoethyl ether, vinylpyridine, vinylxylene, diphenylethylene, tertiary amine-containing diphenylethylene, and primary, secondary, or tertiary amine-containing styrene, and the conjugated diene-based monomer is at least one selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, and octadiene.

13. The rubber composition of claim 11, wherein the rubbery polymer includes the first polymer and the second polymer in a weight ratio of 10 to 200:10 to 200.

14. The rubber composition of claim 10, wherein the reinforcing agent is included in an amount of 10 to 200 parts by weight based on 100 parts by weight of the rubbery polymer.

15. The rubber composition of claim 10 further comprising an extender oil.

16. The rubber composition of claim 15, wherein a weight ratio of the extender oil and the processing aid is 15 to 55:5 to 45.

* * * * *